Nov. 15, 1938.  A. V. PORRO  2,137,180
PAN LIFTER
Filed Nov. 4, 1937

Inventor
A. V. Porro
By L. F. Randolph
Attorney

Patented Nov. 15, 1938

2,137,180

UNITED STATES PATENT OFFICE 2,137,180

PAN LIFTER

Attilio V. Porro, Calexico, Calif.

Application November 4, 1937, Serial No. 172,787

2 Claims. (Cl. 294—34)

This invention relates to a pan lifter and it aims generally to provide a novel construction which is simple, strong and durable and capable of lifting especially hot pans, pots and the like with security and rapidly.

It is further aimed to provide a novel structure having three jaws for engagement with a pot, pan or the like one of which jaws is movable and guided and operated by novel means.

The more specific objects and advantages will become apparent from a consideration of the description following taken in connection with accompanying drawing illustrating an operative embodiment.

In said drawing:—

Figure 1:
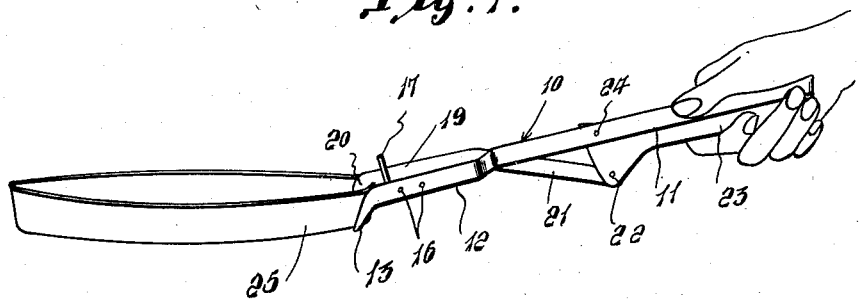
Figure 1 is a view in perspective showing the device in use lifting a pan.
Figure 2:
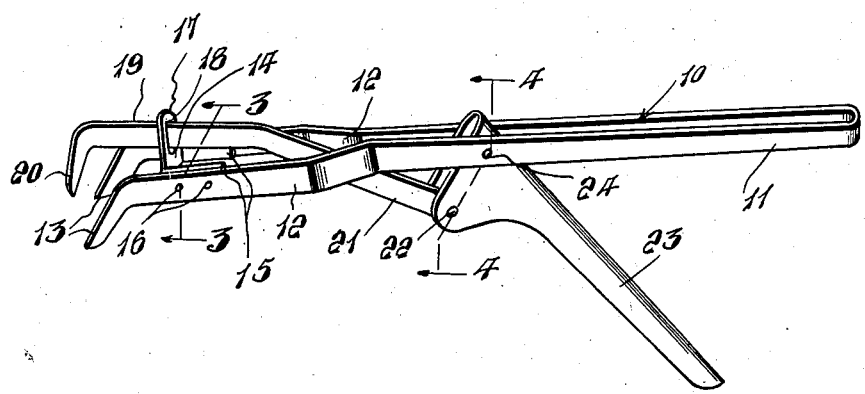
Figure 2 is a perspective view, on a large scale, of the improved lifter.
Figure 3:
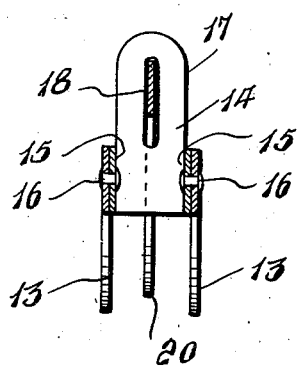
Figure 3 is a detail section taken on the line 3—3 of Figure 2.
Figure 4:
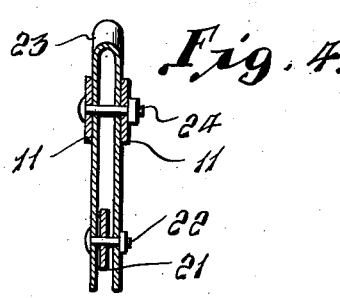
Figure 4 is a detail section taken on the line 4—4 of Figure 2.

Referring specifically to the drawing, 10 designates a main section which preferably consists of a single piece of metal or the like doubled upon itself to provide an elongated handle 11, outwardly offset arms 12 and jaws 13 extending from the free ends of the arms.

In the space between the arms 12 a bracket 14 is disposed, preferably being in a single piece and having ears 15 riveted as at 16 to the arms. Said bracket also has an eyelet 17 extending above the arms provided with a slot 18, through which an arm 19 slidably passes. Such arm 19 has a depending jaw 20 and the rear end portion of the arm 21, is deflected at an angle and at 22, pivotally connected to a lever 23. Lever 23 is preferably made in a single piece of metal and of U-shape in cross section and pivoted as at 24 to the handle 11, so as to operate within the space thereof.

In the use of the device, the wall of a pan, pot or the equivalent as at 25, is engaged between the jaws 13 and 20, following which the lever 23 and handle 11 are grasped and moved relatively as shown in Figure 1, to cause the jaws 13 and 20 to tightly grip the wall of the element 25.

Various changes may be resorted to provided they fall within the spirit and scope of the invention.

I claim as my invention:—

1. A device of the class described comprising a rigid section of U-shape having a handle at one end and having spaced jaws at its free ends, a guide bracket secured to the element adjacent the ends relatively close to said jaws, an arm slidably mounted through said guide bracket having a depending jaw coacting with the first mentioned jaws, and a lever pivoted to said handle and to said arm movable upwardly at its free end relatively to the said handle.

2. A device of the class described comprising a rigid bar of U-shape in plan providing a handle, arms extending outwardly therefrom and laterally spaced jaws depending from the free ends of the arms, a bracket having ears disposed between the arms and secured thereto adjacent said jaws, a guide member on the bracket, an arm slidably mounted through the guide member having a depending jaw at its free end coacting with the first mentioned jaws, a lever of U-shape in cross section pivoted to the handle between the portions thereof, and said last mentioned arm having an angularly extending portion pivoted to said lever, said lever at its free end being movable upwardly toward the free end of the arm.

ATTILIO V. PORRO.